P. L. HILL.
RECORDING MACHINE.
APPLICATION FILED AUG. 7, 1905.

1,124,649.

Patented Jan. 12, 1915.
6 SHEETS—SHEET 1.

WITNESSES:

INVENTOR
BY
ATTORNEYS.

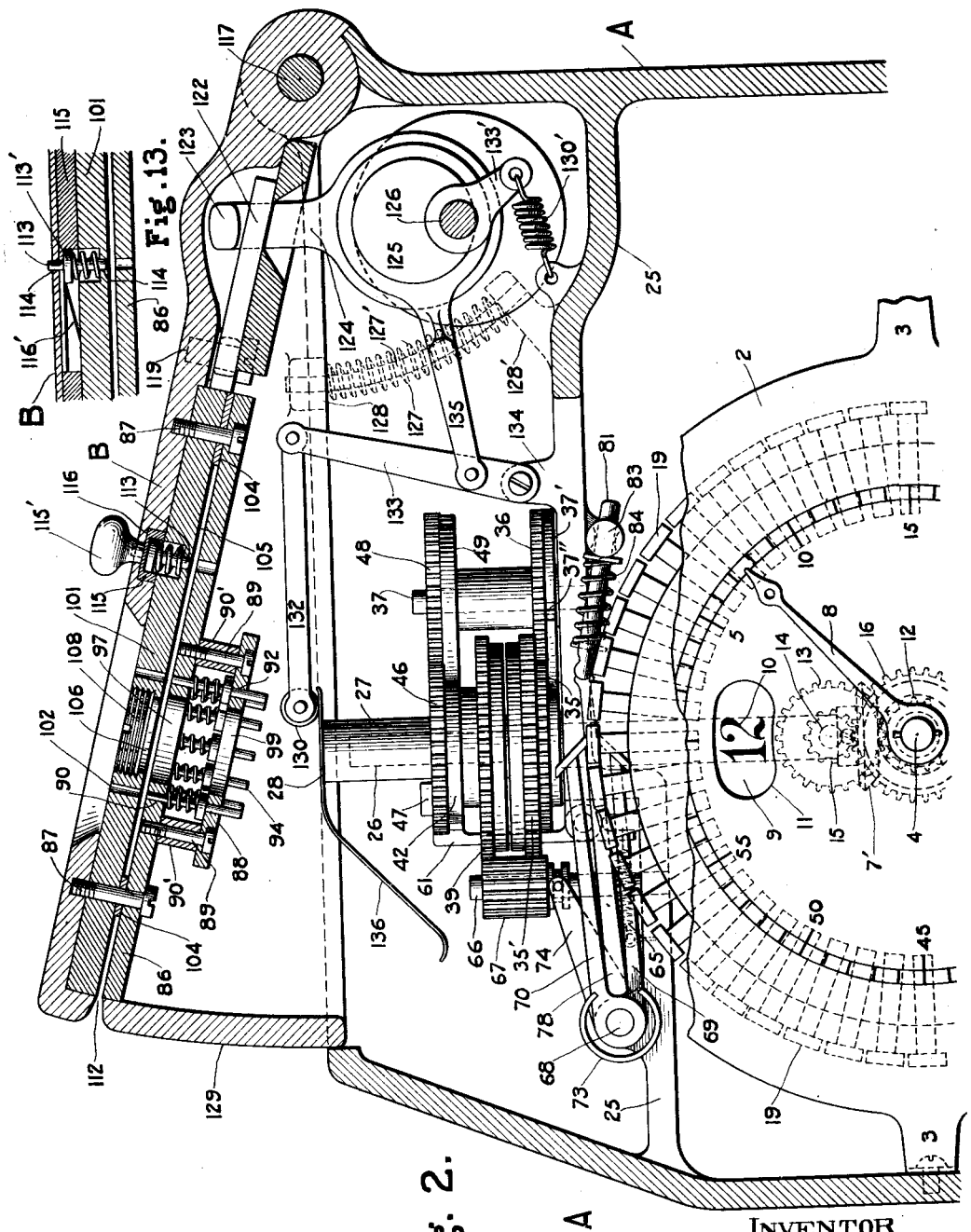

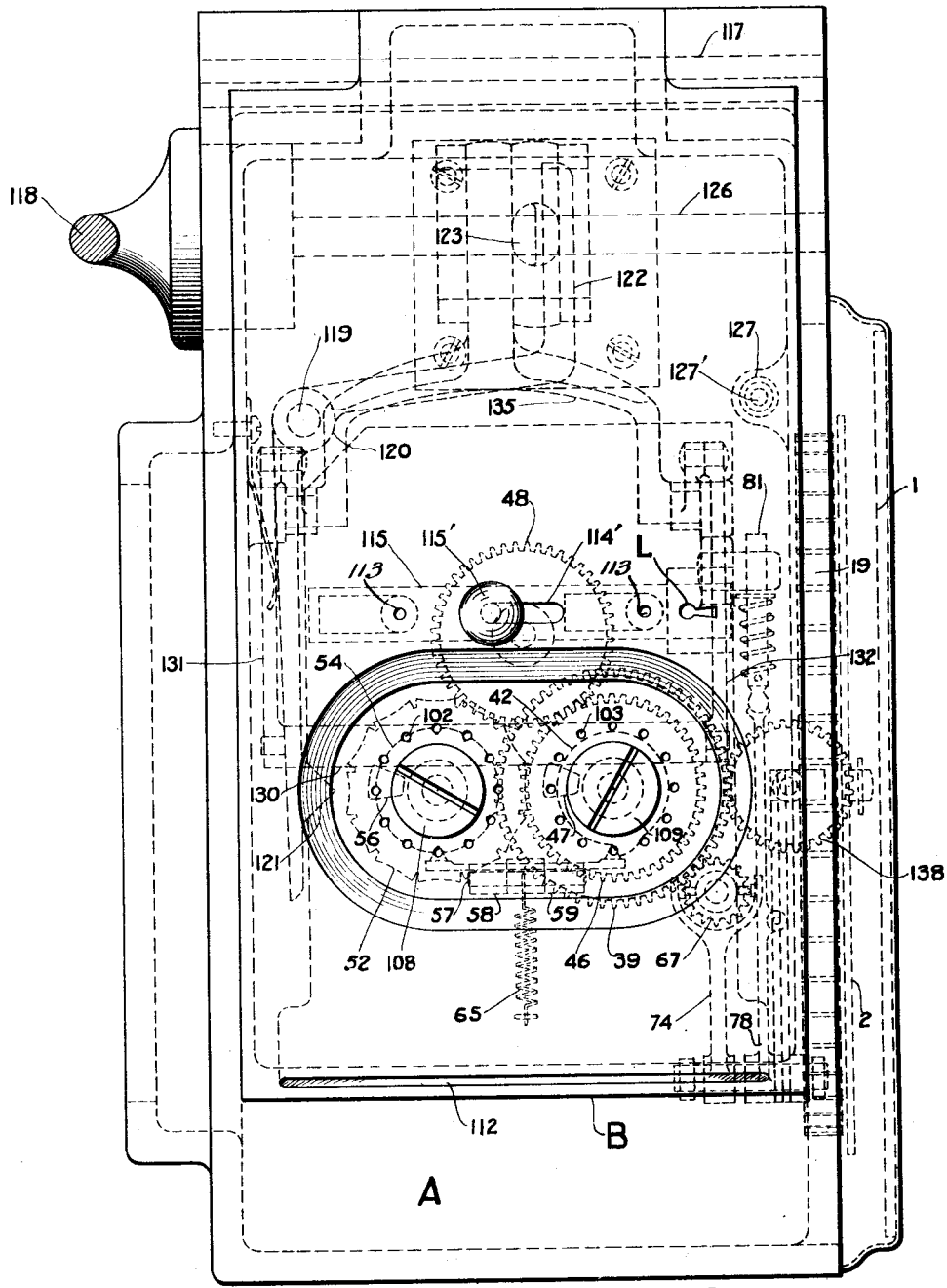

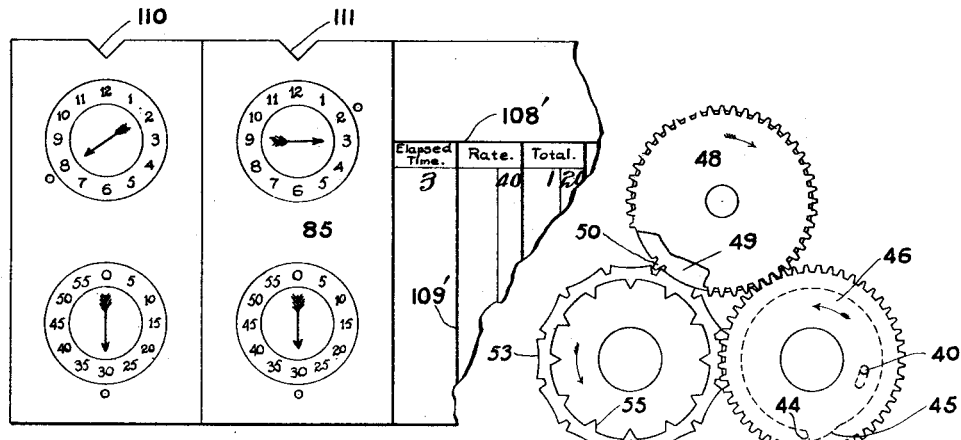
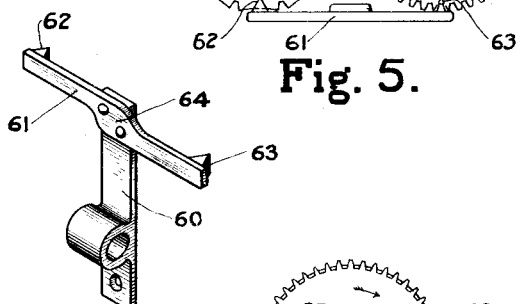
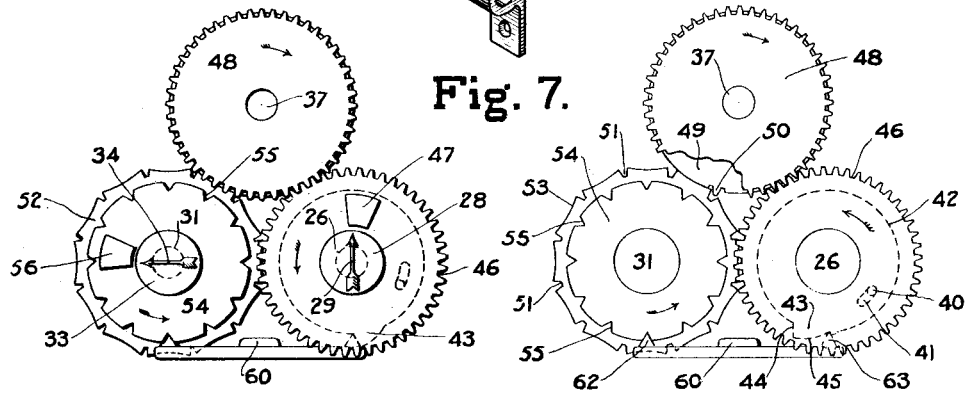

P. L. HILL.
RECORDING MACHINE.
APPLICATION FILED AUG. 7, 1905.

1,124,649.

Patented Jan. 12, 1915.
6 SHEETS—SHEET 5.

WITNESSES:

INVENTOR
P. L. Hill
BY
Warfield & Duell
ATTORNEYS.

UNITED STATES PATENT OFFICE.

PERCY L. HILL, OF NEW YORK, N. Y.

RECORDING-MACHINE.

1,124,649.  Specification of Letters Patent.  Patented Jan. 12, 1915.

Application filed August 7, 1905. Serial No. 272,992.

*To all whom it may concern:*

Be it known that I, PERCY L. HILL, residing at New York, in the county of New York and State of New York, have invented certain new and useful Improvements in Recording-Machines, of which the following is a full, clear, and exact description, such as will enable others skilled in the art to which it appertains to make and use the same.

This invention relates to recording mechanism and has for one of its objects to provide simple and efficient means adapted to record points of time upon a suitable receiving member.

Another object is to provide mechanism in a machine of the above type adapted to form records by a change in shape or condition of the record-receiving member.

Another object is the provision of efficient means adapted to form a pair of records of points of time, the difference in time of which differs from the time elapsing between the times at which they are made by a predetermined amount.

A further object is to provide in a machine of the above type means adapted to insure a correct positioning of the record-receiving member with relation to the record-forming devices.

Other objects will be in part obvious and in part pointed out hereinafter.

The invention accordingly consists in the features of construction, combinations of elements and arrangement of parts which will be exemplified in the mechanism hereinafter described, and the scope of the application of which will be indicated in the following claims.

Figure 1:
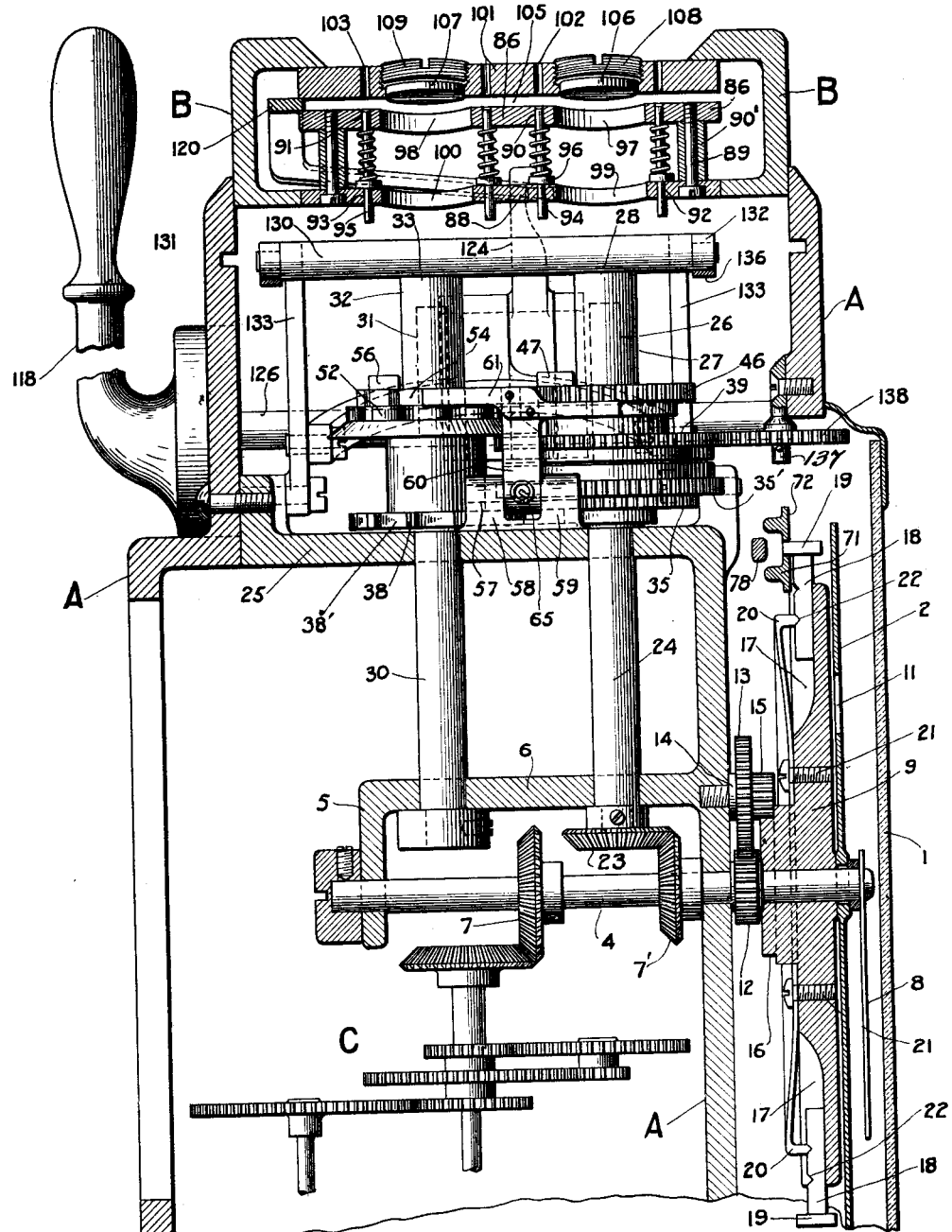
Figure 8:
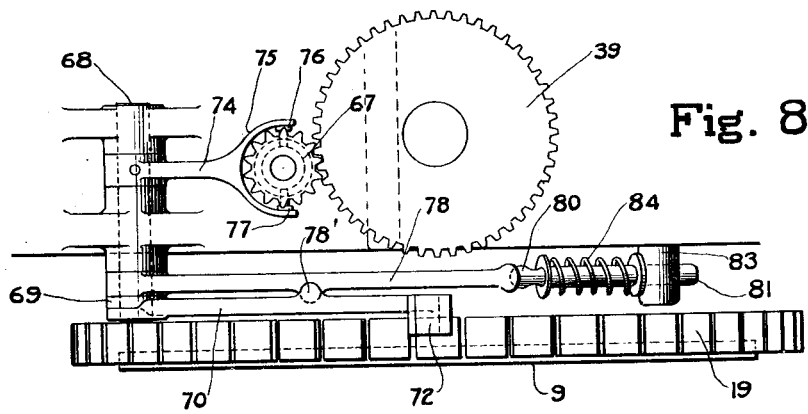
Figure 9:
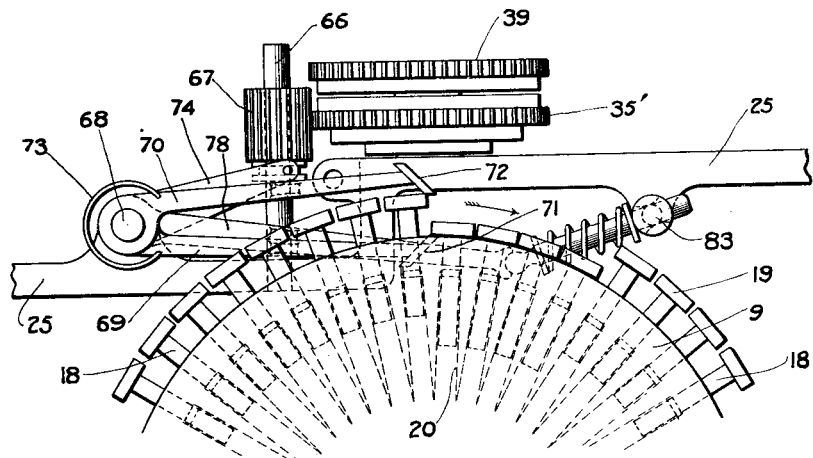
Figure 10:
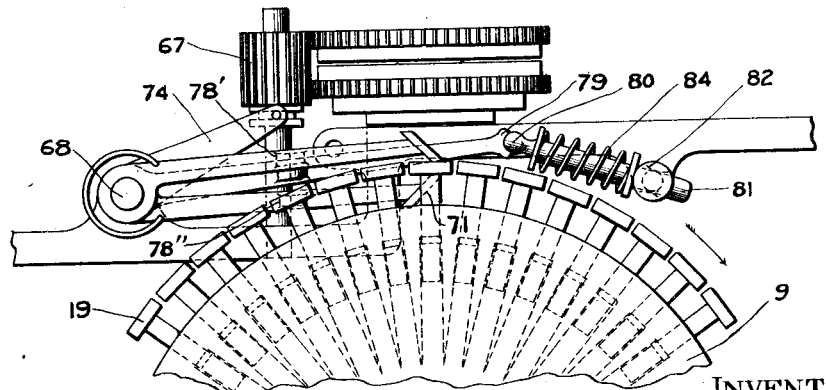
Figure 11:
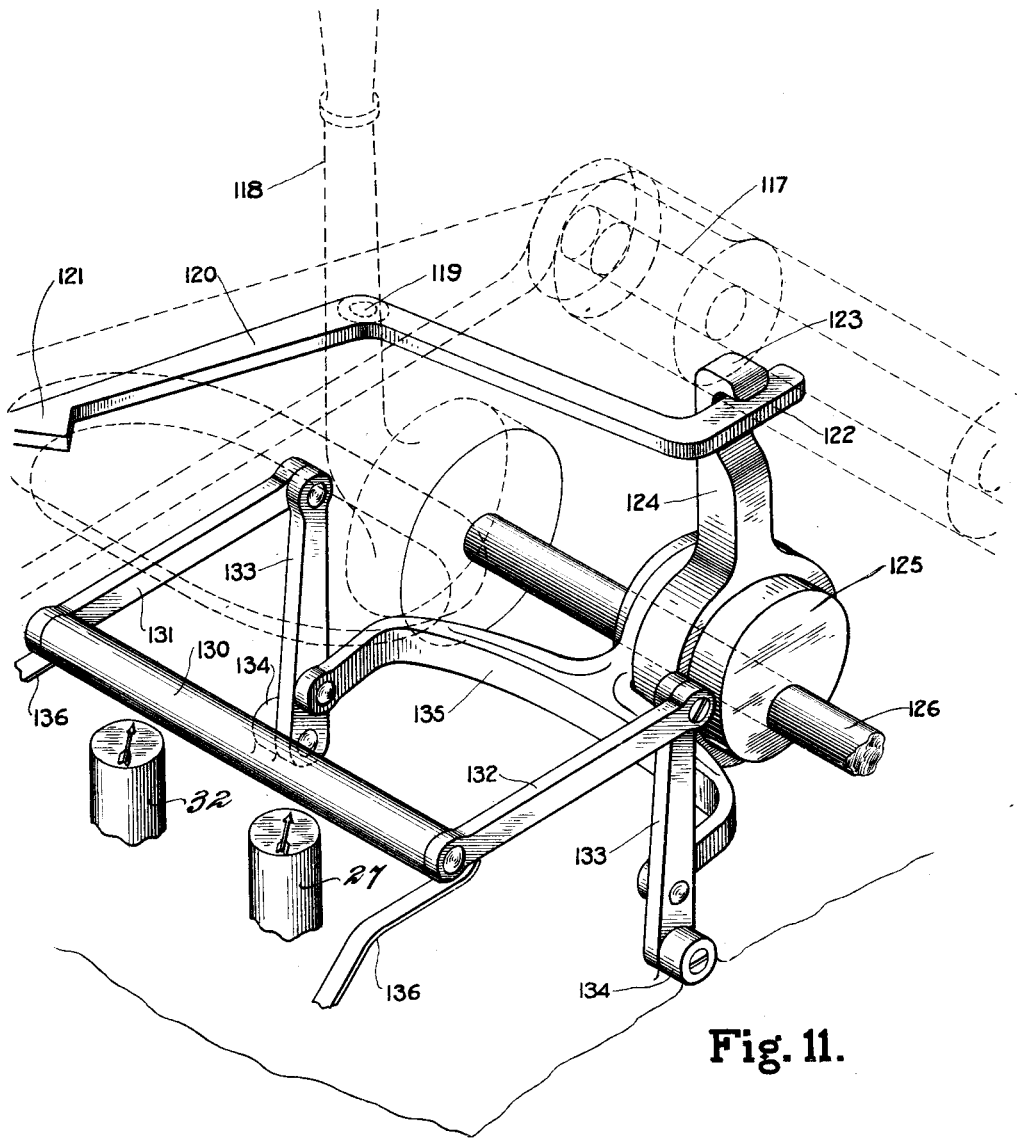

In the accompanying drawings, wherein is illustrated one of the various possible embodiments of my invention, Figure 1 is a front elevation of the same partly in section. Fig. 2 is a side elevation of the same partly in section. Fig. 3 is a plan view of the mechanism adapted to receive and position the record-receiving member, some of the parts being shown in dotted lines. Fig. 4 is a plan view showing the connecting means between the operating means and the mechanism for actuating certain of the record-forming devices immediately preceding an actuation of the record-forming mechanism, certain of the parts being shown in dotted lines. Fig. 5 is a similar view showing the position of the parts at an intermediate stage of the use of the instrument. Fig. 6 is a similar view showing the position of the parts at the conclusion thereof. Fig. 7 is a view in perspective of an actuating pawl. Fig. 8 is a plan view showing the means employed to connect and disconnect certain of the record forming devices. Fig. 9 is an elevation, partly broken away, of the pin-supporting disk showing certain of the pins in a depressed position. Fig. 10 is a view similar to Fig. 9 showing the parts in a different position. Fig. 11 is a view in perspective showing mechanism adapted to actuate the devices for positioning the record-receiving member and the means whereby such devices are put into operation. Fig. 12 is a view showing one of the record-receiving members adapted for use in my recording mechanism. Fig. 13 is a view of a detail of construction.

Similar reference characters refer to similar parts throughout the several views of the drawings.

Preliminary to a description of the specific features of my invention and in order that certain of the broad objects thereof may be easier of understanding, it may be here noted that this invention deals with the provision of means adapted to produce a record of such a character as to be adapted for use in conjunction with other means. I have found that this computation may be most satisfactorily accomplished by forming a record which will effect some physical change in the record-receiving member, as a perforation or change of outline. I have also found it desirable in the accomplishment of these and other ends to form records by varying the relative position of the changed portions with respect to the edges or general configuration of the record-receiving member.

The above and other objects are attained in constructions of the nature of that hereinafter described.

Referring now to the drawings, there is shown at A the casing in which my recording mechanism is inclosed, in one wall of which there is positioned a transparent portion 1, in order that dial 2 may be seen therethrough.

Dial 2 is held in a rigid position by means of spiders 3, secured in casing A, and, in the present instance, has concentrically arranged near the outer edge thereof a series of minute-indicating marks extending clockwise about the same and numbered consecutively in sets of five.

A minute shaft 4, journaled at one end in a downwardly turned extension 5 of a bracket 6 extending inwardly from casing A as shown in Fig. 1 and intermediate its ends in casing A, is adapted to be actuated by any suitable clockwork mechanism C, through bevel gear 7 fixedly positioned thereon. Shaft 4 at its outer end is provided with a minute hand 8 adapted to register time in terms of minutes upon dial 2.

Journaled upon minute shaft 4 is a disk 9, upon the outer face of which are concentrically arranged characters 10 indicative of the hours of the day,—in the present instance, twelve in number—each of which is adapted to be brought successively into registry with an opening 11 in dial 2, as shown in Fig. 2. A pinion 12 on minute shaft 4 meshes with a gear wheel 13 journaled upon a stud 14 fixedly positioned in casing A. Gear wheel 13 carries a stepped down concentrically arranged pinion 15 meshing with a similarly arranged series of integral gear teeth 16 upon disk 9. Disk 9 is therefore adapted to be actuated from minute shaft 4, the gearing being so proportioned as to drive disk 9 with one twelfth the velocity of minute shaft 4, in order that a character indicative of an hour of the day may be brought into registry with opening 11 in dial 2 upon the completion of one revolution of minute hand 8. It will therefore be seen that the time of day may at all times be ascertained, inasmuch as the characters on disk 9 indicate the hours through the opening 11 in dial 2.

Extending from a series of radially arranged openings 17 in the periphery of disk 9 are similarly arranged pins 18, each provided with a head 19, which are adapted to be adjusted in openings 17 and held in either an extended or a depressed position by means of radially arranged leaf-springs 20 fixedly secured to disk 9, as by means of screws 21, the opposite ends of which enter either of two V-shaped depressions or notches 22 in pins 18.

Bevel gear 7' on minute shaft 4 meshes with a bevel gear 23 on shaft 24 journaled at one end in bracket 6 and at its opposite end in the wall of a transversely extending partition 25 of casing A.

Shaft 24 is driven with the same angular velocity as minute shaft 4 and upon an integral post 26 extending upwardly therefrom there is fixedly sleeved a cap 27 provided upon its upper surface with a printing dial 28, the printing character thereon being, in the present instance, an arrow 29.

It will be understood that printing dial 28 and minute hand 8, inasmuch as they are geared to travel at the same angular velocity, complete their revolutions in the same period of time, which in this instance is in the space of one hour.

Shaft 30 is journaled at one end in bracket 6 and at its opposite end in partition 25, and has extending upwardly therefrom an integral post 31 which has fixedly sleeved thereon a cap 32 provided upon its upper surface with a printing dial 33 comprised also, in the present instance, by an arrow 34. The upper surfaces of printing dials 28 and 33 are in the same plane and said dials are otherwise similar in all respects.

Shaft 24 is provided with an integral gear wheel 35 meshing with an idler gear 36 journaled upon a post 37 extending upwardly from partition 25, and idler gear wheel 36 carries an integral wheel 37' provided with a projecting tooth 37''. Tooth 37'' is adapted to engage with any one of a series of recesses or notches 38 in a disk 38' carried by shaft 30. Notches 38 are equally separated by a series of concave peripheral surfaces, each one of which is on an arc described by a radius substantially equal to the radius of wheel 37'.

The arrangement of wheel 37' and disk 38' is such that the periphery of wheel 37' will closely fit in any one of the concavities and normally prevent a rotation of disk 38', the some being rotated one step when engaged by tooth 37'' upon each revolution of wheel 37'. The construction last above described comprises the well known "Geneva stop" and shaft 30 is therefore adapted to be driven by shaft 24, the gearing and connection being so proportioned as to drive the former in a step-by-step movement with one-twelfth the angular velocity of the latter and, inasmuch as shaft 24 operates to drive the minute printing dial 28 through one complete revolution each hour, hour printing dial 33 will be driven, in that space of time, through an arc of 30°.

Journaled upon post 26 of shaft 24 is a gear wheel 39 carrying upon its upper surface a pin 40 extending into a concentric slot 41 in a cam-wheel 42 also journaled upon post 26 and provided with a projecting cam 43.

Cam 43 is comprised by two inclined surfaces 44 and 45, as shown in Fig. 4, the former being more abruptly inclined than the latter.

Cam-wheel 42 has integrally connected therewith a gear wheel 46 also rotatably mounted upon post 26, said gear-wheel 46 being provided with an abutment 47, the function of which will be apparent hereinafter.

Gear-wheel 46 meshes with an idler gear 48 journaled upon post 37 and idler gear 48 is fixedly connected with disk 49 which is provided with a projecting tooth 50 extending from the periphery thereof.

Tooth 50 is adapted to engage with a series of equally spaced notches or recesses 51 in a disk 52 journaled upon post 31 of shaft 30. Recesses 51 are equally spaced apart by a series of concave, peripheral surfaces 53, each one of which is on an arc described by a radius substantially equal to a radius describing the periphery of disk 49.

Disks 49 and 52 are so arranged with respect to each other that the periphery of disk 49 will closely fit in any one of concavities 53. It will be understood that upon a revolution of disk 49 tooth 50 will enter one of the recesses 51 in disk 52 to compel a rotation of said disk through the arc of a circle, the contacting peripheral surfaces of disks 49 and 52 preventing a rotation of disk 52 during the remainder of the revolution of disk 49. Disks 49 and 52 comprise a "Geneva stop" and are so proportioned that a complete revolution of disk 52 will be effected upon the completion of twelve revolutions of disk 49.

Arranged above disk 52 and integrally connected therewith is a wheel 54 having in its outer edge, in the present instance, twelve substantially V-shaped depressions or notches 55. Wheel 54 is also provided with an abutment 56 upon its upper surface, the function of which will be apparent hereinafter.

Pivotally mounted upon a pin 57 extending between brackets 58 and 59 rising from partitions 25, is an arm 60 carrying at its upper end an actuating pawl 61 having at either end thereof substantially V-shaped projections 62 and 63 respectively. Projection 62 is adapted to fit in any one of the V-shaped notches in wheel 54, and actuating pawl 61 is offset at 64 to carry projection 63 downwardly to allow the same to ride upon the periphery of cam-wheel 42. A spring 65 extending between a fixed point on partition 25, acting upon arm 60 constantly urges pawl 61 toward notched wheel 54 and cam wheel 42.

Journaled and slidably mounted upon a stud 66 extending from partition 25 is a pinion 67 meshing with and adapted normally to form a means of connection between gear-wheel 35' carried by shaft 24 and gear-wheel 39 journaled upon post 26. It should therefore be apparent that a rotation of shaft 24 will cause, through pinion 67, a rotation of gear-wheel 39, which, in turn, through pin 40 engaging the walls of concentric slot 41, will rotate cam-wheel 42.

Cam-wheel 42 being integrally connected with gear-wheel 46 will cause a rotation of idler gear 48 and disk 49 carried thereby and disk 49 will therefore, be rotated to bring tooth 50 into engagement with one of recesses 51 of disk 52, and upon a continuance of rotation, would tend slightly to rotate disk 52 and also notched wheel 54 carried thereby. Cam wheel 42 and disk 49 are so arranged that, upon tooth 50 engaging with a recess 51 in disk 52, projection 63 of actuating pawl 61 will be adjacent the longer inclined surface 45 of cam 43. A continuance of the rotation of cam wheel 42 by shaft 24 will cause projection 63 on actuating pawl 61 to ride up the incline surface of cam 43, and projection 62 of actuating pawl will consequently ride up the inclined surface of one of the V-shaped notches or depressions of wheels 54 by reason of the rotation of said wheel by disk 52. When, however, the rotation of cam wheel 42 carries projection 63 over the apex of cam 43, spring 65 will force actuating pawl 61 inward to cause projection 63 to slide down the sharp inclined surface of cam 43. This movement, inasmuch as actuating pawl 61 is fixed against longitudinal movement by brackets 58 and 59, will cause cam wheel 42 to be quickly thrown in its normal direction of rotation, such movement being permitted by the provision of concentric slot 41 which accommodates pin 40. This movement will cause an accelerated movement of disk 49 and, therefore, of disk 52 and notched wheel 54 and projection 62 of actuating pawl 61 being lifted out of one of V-shaped recesses 55 simultaneously with the reaching of projection 63 the apex of cam 43, will be caused to slide along the periphery of notched wheel 54 until engaged with a succeeding V-shaped depression in said wheel. It will, therefore, be seen that, during the constant rotation of shaft 24, an accelerated step-by-step movement at the end of each hour is provided for notched wheel 54 carrying abutment 56, the purpose of which will be hereinafter pointed out.

Journaled upon a rock shaft 68 as shown in Figs. 9 and 10 journaled transversely of casing A are cam-carrying arms 69 and 70 having at their opposite ends cams 71 and 72 respectively, said cams being inclined toward each other. Cam-carrying arms 69 and 70 are constantly urged toward each other by means of a spring 73. Rock shaft 68 has positioned thereon a lever 74 having a forked end 75, the forked members of which carry inwardly extending studs 76 and 77 engaging in a concentric recess in pinion 67.

An arm 78 fixedly connected with rock shaft 68 is provided at its outer end with a socket 79 adapted to receive a ball 80 upon the end of pin 81 extending loosely through an enlarged opening 82 in a stud 83 projecting from the partition 25. Pin 81 is encircled by a spring 84 and normally urged toward arm 78 thereby.

Disk 9 carrying the radially arranged pins 18 is so arranged with respect to cams 71 and 72 that, during a rotation thereof, the heads of pins 18 will be carried between said cams.

In order that the mechanism carrying the abutments 47 and 56 may be disconnected from the actuating mechanism for the printing dials 28 and 33 at a predetermined point of time and for a predetermined space of time, a given number of pins 18 may be depressed in disk 9, said pins being held in such depressed position by means of the leaf springs 20 hereinbefore described. During the rotation of disk 9, when the heads of the depressed pins are brought into engagement with cam 71, the continued movement of said disk will cause cam 71 to be forced downwardly, and when disk 9 has moved sufficiently far to allow cam 72 to be disengaged from the extended pin, spring 73 will force arm 70 downward and cause projection 78' upon said arm to engage with arm 78 and carry said arm downwardly. The downward movement of arm 78 will cause a partial rotation of rock shaft 68, which, through lever 74, will cause pinion 67 to be carried out of mesh with gear wheel 39.

It will be apparent, however, that during the rotation of rock shaft 68, arm 78 will carry pin 81 over the dead center, whereby spring 84 through pin 81 and arm 78 will quickly rock shaft 68 to accelerate the downward movement of cam 71 and the latter part of the movement and therefore the disengagement of pinion 67 from gear wheel 39 will be accordingly accelerated. When a predetermined number of depressed pins have been carried by disk 9 across cam 71, the first extended pin in the disk 9 coming into engagement with cam 72 will force the same upward, and when cam 71 is released from the last depressed pin, arm 69 under the influence of spring 73 will snap upward and projection 78" extending from said arm will engage with arm 78 to cause a partial rotation of rock shaft 68 in the opposite direction to slide pinion 67 along stud 66 to reëngage the same with gear wheel 39. As will be readily understood, spring 84 by reason of pin 81 being carried over the dead center, serves to accelerate the latter portion of the movement thereof. At this point it may be noted that the number of pins on disk 9 bears a definite relation to the minute indicating marks on dial 2. While I do not intend to limit myself to this precise construction, I have, in this illustrative embodiment, constructed the heads of each of said pins of such diameter as to be projected past a given point in the space of fifteen minutes. It will, therefore, be apparent that gear wheel 46 and notched wheel 54 carrying abutments 47 and 56 respectively may be disconnected from printing dials 28 and 33 and caused to remain stationary for the period of fifteen minutes or any multiple thereof.

Hingedly connected to casing A at 117 is the complementary part B of said casing, herein designated " cover section," which in the present instance, is designed to carry the mechanism designed to receive and position the record-receiving member 85, herein designated " record card " (Fig. 2). By the term " record card " I intend to embrace a record receiving member of any character, and while I preferably employ cardboard in the relation shown, I do not intend to limit myself to such employment as many other materials could be advantageously used.

A guide plate 86 is secured to cover section B by suitable means, as screws 87, and depending from guide plate 86 is a second guide plate 88 attached thereto, in the present instance, by screws 89 extending through spacing collars 90'. Guide plates 86 and 88 are each provided with a pair of sets of concentrically arranged openings 90 and 91 and 92 and 93 respectively, the openings in each set being the same in number and the corresponding sets in each pair being in alinement as clearly shown in Figs. 1 and 2. Perforating pins 94 are arranged in alined openings 90 and 92, pins 95 are similarly arranged in alined openings 91 and 93. Pins 94 and 95 extend downwardly through guide plate 88, and integral collars 96 on each of said pins determine the position of the upper ends thereof with respect to guide plate 86, such upper ends being arranged substantially flush with the upper surface of said guide plate.

Arranged concentrically within each set of openings 90 and 91 in guide plate 86 are openings 97 and 98 respectively, and similarly arranged openings 99 and 100 are provided in guide plate 88, openings 97 and 99 and openings 98 and 100 respectively being in registry.

A die 101 is fixedly connected to cover section B by screws 87 and is provided with two sets of concentrically arranged openings 102 and 103, the openings in each set being the same in number and each being in absolute registry respectively with the openings 90 and 91 in guide plate 86. Guide plate 86 and die 101 are spaced slightly apart by spacing blocks 104 to provide a narrow space or recess 105 to allow the insertion of the record card there-between. Arranged interiorly of each of said concentric series of openings in die 101 are platens 106 and 107 of hardened rubber or other suitable material. Platens 106 and 107 are adjustably mounted in die 101, inasmuch as they are carried by threaded plugs 108 and 109 respectively which are threaded in openings in said die.

At this point it may be noted that the concentrically arranged sets of alined openings in guide plate 86 and 88 and die 101 are so arranged with respect to printing dials 28 and 33 that when the record card receiving mechanism is operated by the means hereinafter to be described, printing dials 28 and 33 will enter the registering openings of guide plates 86 and 88 respectively and each will be encircled by one set of the concentrically arranged pins 94 and 95 arranged about said openings, each pin of which will be equally distant from the axial center of the dial encircled by the set to which it belongs. Abutments 56 and 47 carried by notched wheel 54 and gear wheel 46 are so arranged as to be brought successively in alinement with any one of the concentrically arranged pins 95 and 94 respectively. Abutment 56 is, therefore, designed to co-act with any one of pins in set 95, while abutment 47 is adapted to co-act with any one of pins in set 94.

Although I do not intend to limit myself to the employment of any particular number of pins, I have, in this illustrative embodiment, provided twelve in each set. Platens 106 and 107, being concentrically arranged within each of said series of concentrically arranged pins, will, when the card positioning mechanism is forced downwardly, be in perfect registry with printing dials 28 and 33 respectively.

A description of my record-receiving member or record card may, at this point, be advantageous in order that the construction of certain of the parts may be more readily understood. My preferred form of record card comprises a strip of material, preferably cardboard, having imprinted or stamped thereon a plurality of sets of indicating devices. As shown herein, I have provided two pairs of concentrically arranged sets of indicating characters, each set being of a slightly smaller diameter than the diameter of the concentrically arranged pins 94 and 95. Each set simulates in a measure a clock dial, one set in each pair being numbered clockwise from one to twelve to denote hours, the other set of each pair being also numbered clockwise from zero to sixty in sets of five to denote minutes. The card may also, if desired, be ruled with horizontal lines, as at 108', to furnish a space thereabove, in which may be written the name of the workman, and may also be ruled with vertical lines 109' to provide columns in which a graphic record may be kept of the elapsed time, the rate per hour, and the amount of wages due the workman. The ruling of the card, however, is merely for convenience and does not form any essential part of my present invention. Located in one edge of the record card are irregularities 110 and 111, preferably V-shaped notches, the function of which will be presently apparent. Recess 105 is accessible through a suitable aperture 112 in cover section B and is of such a depth that when one edge of the record card 85 is in engagement with the bottom wall thereof, one pair of indicating devices or characters on record card 85 will be in registry with the concentrically arranged sets of pins 94 and 95. Recess 105 is of sufficient width to allow the insertion of the record card therein, spacing blocks 104 engaging the edges of said card and preventing a lateral movement thereof. It may, therefore, be noted that, inasmuch as the edges of the card engage with spacing blocks 104 and bottom wall of recess 105, the position of one pair of indicating characters thereon with respect to the concentrically arranged sets of pins 94 and 95 and, consequently, printing dials 28 and 33 respectively will be exactly determined.

In order that the position of the remaining pair of indicating devices on record card 85 may be determined with respect to printing dials 28 and 33 and the corresponding sets 94 and 95 of the concentrically arranged perforating pins, I provide spring controlled pins 113 slidably mounted in guiding openings 114 extending through the upper wall of cover section B and also through die 101. Pins 113 are adapted to be projected downwardly through recess 105 into registering openings in guide plate 86 by means of a sliding cam bar 115 (Fig. 13) mounted in a recess 116 extending transversely of cover section B which is provided with an operating handle or knob 115' occupying a transverse recess 114' in the upper wall of said cover section.

Cam bar 115 is provided with cams 116' coacting with shoulders 113' upon pins 113. It will be apparent that a sliding movement of cam bar will force pins 113 downwardly to form abutments for the edge of record card 85, and thereby determine the position of the remaining pair of indicating devices as above described.

If desired, a lock L (Fig. 3) may be provided to insure against an operation of cam bar 115 unless unlocked by the employee in charge of the machine. It is, of course, obvious that the arrangement of the indicating devices on the record-receiving member is purely arbitrary and the number of pairs thereof and arrangement thereof may be considerably changed without effecting a departure from the spirit of my invention. It is only essential that the position of the indicating characters with respect to the record forming devices be accurately determined by the edge of the record-receiving member or record card engaging with the walls or recess 105 or with abutments, as in the present instance, pins 113 suitably arranged therein.

To rock shaft 126 extending transversely and exteriorly of casing A, there is secured an operating handle 118.

In order to insure the correct positioning of record card 85 in recess 105 and to provide against a careless manipulation of the mechanism, I have provided means whereby the machine is inoperative to produce a record unless the record card is properly positioned to receive such record. Pivotally mounted upon a stud screw 119 and extending slightly within recess 105 between guide plate 86 and die 101 is a bell crank lever 120 having at one end an irregularity of similar configuration to irregularities 110 and 111 in card 85, in the present instance, preferably a V-shaped projection 121. At its opposite end, bell crank lever 120 is provided with a bent portion 122 adapted to be engaged by a lateral extension or hook 123 upon the upper extremity of an actuating lever 124 journaled eccentrically at 125 upon rock shaft 126 journaled in casing A as clearly shown in Fig. 2. When record card 85 is properly positioned in recess 105, projection 121 on bell crank lever 120 occupies one of the V-shaped notches 110 or 111 in the record card and, in this position, bent portion 122 of bell crank lever 120 is in position to be engaged by hook 123 of lever 124. Lever 124 being eccentrically journaled upon rock shaft, it will be apparent that a rotation of said rock shaft by means of handle 118 will draw the complementary part or cover section B of casing A downwardly. Should, however, a workman improperly place the record card in recess 105, projection 121 of bell crank lever 120 will ride upon one of the edges thereof and, in this position, bent portion 122 will be swung from the position in which it is adapted to engage with hook 123 and the downward swing of lever 124 will not effect a movement of the record card receiving mechanism.

A spring 127 acting against a lug 128 upon cover section B and a lug 128' upon partition 25 and maintained in position by a curved arm 127' may be provided to maintain the parts always in a position for actuation and to return the record receiving mechanism or cover section B to its normal position after each actuation thereof. Cover section B is provided with a depending portion 129 which serves to make a complete closure for the casing.

In order that printing dials 28 and 33 may be supplied with ink, I provide an inking roller 130 carried by arms 131 and 132 pivotally mounted upon rocker levers 133, which are, in turn, pivotally mounted in brackets 134 extending from partition 25. A member 135 mounted eccentrically upon rock shaft 117 is pivotally connected to rocker-levers 133. Inking roller 130 rides upon guiding tracks 136 extending transversely of printing dials 28 and 33, thence downwardly, as clearly shown in Fig. 2. The upper surfaces of tracks 136 are arranged substantially in alinement with the upper surfaces of dials 28 and 33.

A spring 130' extending between a fixed point upon partition 25 and an arm 133' extending from shaft 126 operates to return the inking roller and operating handle to their normal positions at the conclusion of each actuation of cover section B.

To a stud 137 secured to casing A there is journaled a pinion 138 meshing with gear wheel 39 journaled on post 26 of shaft 24. It will be obvious that, by a manual operation of pinion 138, the mechanism carrying abutments 47 and 56 actuated by gear wheel 39 may at any time be properly set and correspond with the angular position occupied by the arrows upon printing disk 28 and 33 respectively.

Having thus described my invention, the operation thereof, which should be largely obvious from the above description, is substantially as follows: It may again be noted that my recording mechanism is designed, in this illustrative embodiment, to make two independent records of time upon the record receiving member or record card, the first of which is indicative of the total elapsed time between the actuations of the recording mechanism, while the second is indicative of a record which differs from the time elapsed between said actuations by a predetermined amount. The advantages of these two independent records will be apparent when it is taken into consideration that it is desirable not only to have indicated the exact time of entry and exit of a workman, but that allowance be made for the time the workman is not engaged, as during the noon hour or other period of time of predetermined length. Having properly set abutments 47 and 56 by means of manually operated pinion 138 to correspond with the angular position occupied by the arrows on printing dials 28 and 33 respectively, and having started the clockwork mechanism, the machine is ready for operation. It will be understood, of course, from the above description that a constant movement is imparted to minute hand 8 and disk 9 by the clockwork C, while minute printing dial 28 and hour printing dial 33 are also rotated at their proper relative velocities through the gearing connected with minute shaft 4. Gear wheels 35 and 39 being normally connected to revolve in unison by pinion 67, abutment 47 is constantly rotated and abutment 56 upon notched wheel 54 is, by the

Geneva stop movement, actuated one step each hour, actuating pawl 61 and the coacting mechanism serving to accelerate this step-by-step movement, as will be understood from the above description.

The requisite number of pins 18 are now forced to their depressed positions in disk 9, leaf springs 20 operating to maintain the same in such positions. The number of pins so depressed depends, of course, upon the space of time it is desired to deduct from the total elapsed time between the actuations of the record card-receiving mechanism. It is to be understood that the pins 18 are depressed by hand in advance in accordance with a predetermined period of time which it is desired to deduct from the reckoning. The mechanism operating as described, when a workman upon his entrance properly positions a record card 85 in recess 105 and pulls down operating handle 118, the movement imparted to rock shaft 117 will cause eccentrically mounted lever 124 to engage with bent portion 122 of bell crank lever 120, the record card-receiving mechanism will thereby be carried downwardly toward printing dials 28 and 33, and the record card will be brought into engagement therewith, arrows 29 and 34 imprinting thereon within the concentrically arranged character impressions corresponding in configuration to the arrows on printing dials 28 and 33 the angular disposition of the same upon the card depending upon the particular point of time at which the impressions are made. It may here be noted that the portions of the record receiving the impressions will be interposed between printing dials 28 and 33 and platens 106 and 107 respectively. Simultaneously with the contacting of the record card with printing dials 28 and 33 the lower end of one of pins in each of concentrically arranged sets 94 and 95 will be intercepted by abutments 47 and 56 respectively, and a further downward movement thereof will be prevented, the continued downward movement of the record card receiving means causing the pins resting upon the abutments to perforate the record card and enter the alined openings in die 101. Inasmuch as abutments 47 and 56 have been previously set to correspond in position with the angular direction assumed by the arrows 29 and 34 of printing dials 28 and 33 respectively, the relative position of the perforations in record card 85 will exactly correspond to the angular position occupied or indicated by the indicating characters impressed thereon by arrows 29 and 34. The concentrically arranged characters upon the record receiving member being arranged to simulate clock dials, as above explained, the arrows and perforations will separately indicate thereon two independent records, each denotative of the time of actuation.

Upon the releasement of operating handle 118, spring 127 forces the record card-receiving mechanism to its normal position. At a predetermined point of time, disk 9 carrying pins 18 will bring the first one of the said depressed pins therein to such position that the head 19 of said pin will engage cam 71 to force the same downwardly, by which movement rock shaft 68 will be slightly rotated and thereby cause lever 74 to withdraw pinion 67 from mesh with gear wheel 39. Gear wheel 39 will thereafter remain at rest until the heads of a predetermined number of depressed pins have passed over cam 71, when the head of the first extended pin will engage cam 72 and, through arm 70, cause a reverse rotation of rock shaft 68, thereby causing lever 74 to again engage pinion 67 with gear wheel 39, effecting a reëngagement of the abutment carrying mechanism. It is to be understood that the left hand pair of dials denotes "in" time and that the right hand pair denotes "out" time and that the latter are imprinted when the pins 113 are depressed to make the depth of the card slot less. It will, accordingly, be seen that, by reason of the provision of the radially exending pins 18, the abutment-carrying mechanism may be disconnected from the clockwork mechanism at any predetermined time and again connected at any predetermined time, the time elapsing between the two operations depending absolutely upon the number of pins depressed. It will also be apparent that several predetermined periods of rest may be given the perforating mechanism, as, for instance, by depressing several separate pins or sets of pins in disk 9. Arm, 78 carried by rock shaft 68 will, when the same carries pin 81 over the dead center, be carried either upwardly or downwardly by said spring-controlled pin, thereby accelerating the engagement and disengagement of pinion 67 with gear wheel 39. The workman, upon his exit, having completed any period of labor, again inserts the record card in recess 105, pins 113 having been properly projected into the transverse openings 114 to determine the position of the second pair of concentrically arranged characters on said record card with respect to the perforating and printing mechanism, as hereinbefore explained. Handle 118 being again operated as before, causes the record card receiving mechanism to again be projected toward the record producing mechanism, printing dials 28 and 33 stamping thereon arrows indicative of the time of actuation. Abutments 47 and 56 will again intercept a certain pin in each of said concentrically arranged sets 94 and 95 respectively and cause the same to perforate the card. The perforations last produced will, however, indicate a point of time behind that indicated by the arrows, the difference being, of course, exactly equal to the period of time during which the perforating mechanism has been disconnected from its actuating means.

During the operation of record-receiving mechanism, inking roller 130 will be reciprocated across printing dials 28 and 33 and properly ink the same, as hereinbefore described. It will, accordingly, be seen that the record card will have produced thereon two complete records in terms of hours and minutes of the workman's time, the first being indicative of the times of entry and exit, the second of the total time of actual labor, and the difference between the two records being of a predetermined amount.

It will, therefore, be seen that I have provided a recording mechanism of simple construction and well adapted to attain the objects of my invention, and which is also characterized by positiveness of action and possessing the manifest advantage of extreme accuracy of operation, the several parts coöperating to form independent records of absolute reliability.

While I have shown my invention as applied to a machine of the above type, I do not wish to be understood as limiting its employment exclusively to such type, nor in fact to any particular form of machine, as many of the features herein are capable of use in a variety of relations in machines of other types.

It will be obvious of course, that it is not necessary to the successful operation of my machine that the printing mechanism and the perforating mechanism be set each day and correspond in angular position as the total elapsed time will at all times be registered by the printing mechanism while the perforating means will at all times record the actual time of employment.

As many changes could be made in the above construction and many apparently widely different embodiments of my invention could be made without departing from the scope thereof, I intend that all matter contained in the above description or shown in the accompanying drawings shall be interpreted as illustrative and not in a limiting sense.

I desire it also to be understood that the language used in the following claims is intended to cover all of the generic and specific features of the invention hereindescribed and all statements of the scope of the invention which, as a matter of language, might be said to fall therebetween.

Having described my invention, what I claim as new and desire to secure by Letters Patent is:—

1. In a mechanism of the class described in combination, clockwork, means adapted to hold a record receiving member, a plurality of spring retracted stamping members movable separately and collectively, and means controlled by said clockwork adapted to be interposed in the path of one of said members upon the same being collectively moved, said interposed means being adapted to force the stamping member in the path of which it is positioned into engagement with said record receiving member.

2. In a mechanism of the class described, in combination, clockwork, means adapted to hold a record receiving member, a plurality of stamping means movable separately and collectively, means adapted to be interposed in the path of one of said stamping members upon the same being collectively moved, means controlled by said clockwork and controlling the position of said interposed means, and means adapted to move said stamping members collectively and force the member in the path of which said interposed means is placed, into engagement with said record receiving member.

3. In a mechanism of the class described, in combination, clockwork, means adapted to hold a record receiving member, a plurality of circularly disposed pins movable separately and collectively, means adapted to be interposed in the path of one of said pins, means driven from said clockwork controlling the position of said interposed means, and means adapted to move said pins collectively and force the pin in the path of which said interposed means is positioned, into engagement with said record receiving member and form a record thereon indicative by its position relative to the outline of said record receiving member, of a point of time.

4. In a mechanism of the class described, in combination, clockwork, means adapted to hold a record receiving member, a plurality of circularly disposed sets of pins movable separately and collectively, and means adapted to be interposed in the path of one of the pins of each of said sets, means driven from said clockwork adapted to control the positions of said interposed means, and means adapted to move said sets of pins collectively and force the pins in whose path said interposed means are placed, into engagement with said record receiving member and form records thereon indicative by their positions about centers, of a point of time.

5. In a mechanism of the class described, in combination, clockwork, means adapted to hold a record receiving member, a plurality of pins movable separately and collectively, and means adapted to be interposed in the path of one of said pins, means driven from said clockwork adapted to control the position of said interposed means, and means adapted to move said pins collectively and force the pin in the path of which said interposed means is placed, through said record receiving member.

6. In mechanism of the class described, in combination, means adapted to hold a record receiving member, clock work, and independent means adapted to be driven from said clock work adapted to make simultaneously upon said record receiving member independent records of different characteristics of points of time, one of which is the absolute time of day at which the record is made and the other of which is a qualified point of time previous to the absolute time at which the record is made.

7. In mechanism of the class described, in combination, means adapted to hold a record receiving member, and means adapted simultaneously to make upon said record receiving member independent records of time, one of which is the absolute time at which the record is made and the other of which is a point of time lessened by a predetermined amount, said records having different characteristics.

8. In mechanism of the class described, in combination, means adapted to hold a record receiving member, clockwork, and means adapted to be driven from said clockwork adapted to make simultaneously upon said record receiving member independent records of points of time, one of which is the time at which the record is made and the other of which is a qualified point of time lessened by a predetermined amount.

9. In mechanism of the class described, clockwork, means adapted to hold a record receiving member, means adapted to be driven from said clockwork adapted to perforate said record receiving member at a point indicative by its position relative to the outline of the record receiving member of a point of time, and means driven from said clockwork adapted simultaneously with the formation of said first-mentioned record to form upon said record receiving member an independent record indicative of the point of time at which the records are made.

10. In mechanism of the class described, in combination, clockwork, means adapted to hold a record receiving member, means adapted to form in said record receiving member a plurality of perforations collectively indicative by their angular disposition about centers of a qualified point of time lessened by a predetermined amount, and means driven from said clockwork adapted simultaneously with the formation of said first record to form a second record upon said record receiving member indicative of the point of time at which the records are made.

11. In mechanism of the class described, in combination, means adapted to hold a record receiving member, clockwork, a plurality of separately and collectively movable pins, means adapted to be driven from said clockwork adapted to be interposed in the path of one of said pins, and means adapted to move said pins collectively and force the pin in the path of which said interposed means is placed into engagement with said record receiving member, and independent recording means having means driven from said clockwork and adapted to engage said record receiving member substantially simultaneously with said pin.

12. In mechanism of the class described, in combination, means adapted to hold a record receiving member, clockwork, a set of circularly disposed pins said pins being separately and collectively movable, rotary means adapted to be driven from said clockwork adapted to be interposed in the path of one of said pins, a printing dial driven from said clockwork, and means adapted simultaneously to force said printing dial into engagement with said record receiving member and form a record thereon indicative of the point of time at which the record is made and to force the pin in the path of which said interposed means is placed, through said record receiving member and form a record thereon indicative by its angular disposition about a center, of a point of time.

13. In mechanism of the class described, in combination, a casing, clockwork positioned within said casing, means movably mounted relative to said casing adapted to hold a record receiving member, a plurality of sets of circularly disposed pins upon said movably mounted means, a plurality of printing dials driven from said clockwork, a plurality of means adapted to be driven from said clockwork each of which is adapted to be interposed in the path of one of said pins, and means adapted to move said movably mounted means toward said casing and throw said record receiving member into engagement with said printing dial and form thereon a record indicative of the point of time at which the record is made and force therethrough the pins in the paths of travel of which said interposed means are placed and form a record thereon indicative by its position relative to the outline of the record receiving member, of a point of time.

14. In mechanism of the class described, in combination, means adapted to hold a record receiving member, clockwork, means connected with said clockwork adapted to print upon said record receiving member two successive records each indicative of the point of time at which the record is made, and means adapted to form upon said record receiving member simultaneously with the formation of each of said first-mentioned records a record, the period of time between which last-mentioned records differ from the period between said first-mentioned records by a predetermined amount.

15. In mechanism of the class described, in combination, means adapted to support a record receiving member, clockwork, record forming means, a connection between said clockwork and said record forming means whereby said clockwork is adapted to drive said record forming means, and means adapted automatically to disconnect said clockwork from said record forming means for a predetermined period of time and automatically to re-connect the same at the end of said period, said means comprising adjustable members adapted to vary said period.

16. In mechanism of the class described, in combination, means adapted to support a record receiving member, clockwork, record forming means, a connection between said clockwork and said record forming means whereby said clockwork is adapted to drive said record forming means, and means adapted automatically to disconnect said clockwork from said record forming means at a predetermined point of time and for a predetermined period of time and automatically to re-connect the same at the expiration of said period, said means comprising adjustable members adapted to vary said point and the duration of said period.

17. In mechanism of the class described, in combination, means adapted to support a record receiving member, clockwork, record forming means, a connection between said clockwork and said record forming means whereby said clockwork is adapted to drive said record forming means, means adapted automatically to disconnect said clockwork from said record forming means at predetermined periods of each day and automatically to re-connect the same at the expiration of each period, said means comprising adjustable members adapted to vary the time, duration and number of said periods of disconnection.

18. In mechanism of the class described, in combination, a clockwork driven disk, a plurality of pins about said disk, each of which is adapted to maintain one of a plurality of predetermined positions, means adapted to support a record receiving member, record forming means adapted to co-act with said record receiving member and record a record thereon, a connection between the clockwork and said record forming means, and means adapted successively to co-act with said pins and disconnect and connect said clockwork with said record forming means in accordance with the position of the pin with which it co-acts.

19. In mechanism of the class described, in combination, means adapted to support a record receiving member, clockwork, a disk driven from said clockwork, a plurality of pins radially disposed about said disk, each of said pins being adapted to assume and maintain a plurality of positions with respect thereto and each of said pins being provided with a head, record forming means adapted to co-act with said record receiving member, a connection between said clockwork and said record forming means, and a member co-acting with the heads of said pins and adapted to connect and disconnect said clockwork and said record forming means in accordance with the positions of said pins.

20. In mechanism of the class described, in combination, means adapted to support a record receiving member, clockwork, a disk driven from said clockwork, a plurality of pins radially disposed about said disk, each of said pins being adapted to assume and maintain a plurality of positions with respect thereto and each of said pins being provided with a head, record forming means adapted to co-act with said record receiving member, a connection between said clockwork and said record forming means, and a member co-acting with the heads of said pins and adapted to connect and disconnect said clockwork and said record forming means in accordance with the position of said pins, and spring pressed means adapted to tend to maintain said co-acting means in the position in which it is placed.

21. In mechanism of the class described, in combination, means adapted to support a record receiving member, clockwork, a disk driven from said clockwork, a plurality of pins radially disposed about said disk, each of said pins being provided with a head, spring pressed means adapted to maintain said pins in each of a plurality of positions, a gear connected with said clockwork, a gear connected with said record forming means, a third gear adapted to connect said gears and transmit power from one to the other thereof, movable means upon which said third gear is mounted, a pair of spring pressed members adapted respectively to engage the upper and lower sides of the heads of said pins and move said third gear into connecting or disconnecting position in accordance with the position of the pin with which said members are co-acting, and spring pressed means adapted to retain said third gear in the position in which it is placed.

22. In mechanism of the class described, in combination, clockwork, a disk adapted to be driven from said clockwork, a plurality of movable members radially disposed about said disk, a gear driven from said clockwork, means adapted to support a record receiving member, record forming means adapted to co-act with said record receiving member, a gear connected with said record forming means, a movable gear adapted in one position to connect said first and said second gears and in another position to disconnect the same, heads formed upon said radially disposed members, a pair of members adapted respectively to co-act with the upper and lower sides of said heads, a spring tending to force said members one toward the other, a rock shaft upon which said co-acting members are mounted, a connection between said rock shaft and said gear adapted to throw the same into connecting or disconnecting position in accordance with the positions of the heads with which said co-acting members engage, and spring pressed means adapted to tend to maintain said third gear in the position in which it is placed.

23. In mechanism of the class described, in combination, clockwork, means adapted to support a record receiving member, time printing means connected with said clockwork and adapted to co-act with said record receiving member, a rotary member connected with said clockwork, record forming means adapted to co-act with said record receiving member, a rotary member connected with said record forming means, means adapted to connect said rotary members one with another, a disk driven from said clockwork, a plurality of pins radially disposed about said disk, and means co-acting with said pins adapted to connect and disconnect said rotary members in accordance with the position of said pins.

24. In mechanism of the class described, a driving member, a member intermittently driven therefrom, means adapted to lock said driven member, a member connected with said driving member adapted to operate said locking means to lock and unlock said driven member, said member being adapted to be moved relative to said driving member by said locking means upon the same assuming locking position.

25. In mechanism of the class described, in combination, a driving member, a member driven therefrom, a connection between said members adapted to permit a limited relative movement, a member intermittently driven from said driving member, a plurality of irregularities in the outer surface of said last-mentioned member, a spring pressed member adapted to engage said irregularities and prevent movement of said intermittently driven member, and a projection upon said second-mentioned member adapted to engage and release said spring pressed locking member and to be engaged and moved thereby upon the same assuming locking position.

26. In mechanism of the class described, in combination, clockwork, a disk driven from said clockwork, a plurality of pins radially disposed about said disk, each of which is adapted to assume and maintain a plurality of positions with respect thereto, means adapted to support a record receiving member, record forming means adapted to co-act with said record receiving member, a connection between said record forming means and said clockwork, means co-acting with said pins adapted to connect or disconnect said clockwork and said record forming means in accordance with the positions of said pins, and means connected with said clockwork adapted to co-act with said record receiving member simultaneously with the action of said first-mentioned record forming means and record thereon the time at which the record is made.

27. In mechanism of the class described, in combination, clockwork, a disk driven from said clockwork, a plurality of pins radially disposed about said disk, each of which is adapted to assume and maintain a plurality of positions with respect to said disk, means adapted to support a record receiving member, a pair of record forming means, one of which is adapted to co-act with said record receiving member and indicate an hour thereon, and the other of which is adapted to co-act with said record receiving member and indicate a fraction of an hour, a connection between said clockwork and said second record forming means, means adapted to co-act with said pins and make or break said connection in accordance with the position of the pin with which it co-acts, means driven from said second record forming means adapted intermittently to drive said first record forming means, means adapted to lock said first record forming means, and a member connected with said second record forming means adapted to release and re-lock said locking means, said locking member being adapted to be moved relatively to said clockwork by said locking means upon the same assuming locking position.

28. In mechanism of the class described, in combination, record forming means, a manually controlled member, means adapted upon movement to force a record receiving member into operative relation to said record forming means, a connection between said manually controlled member and said second-mentioned means, and means controlled in accordance with the shape of said record receiving member adapted to break said connection.

29. In mechanism of the class described, in combination, record forming means, means adapted to receive a record receiving member and force the same into operative relation to said record forming means upon being set in operative condition, and means controlled in accordance with the depth of insertion of said record receiving member adapted to place said second means in operative condition.

30. In mechanism of the class described, in combination, record forming means, means adapted to receive a record receiving member, manually controlled means adapted upon being connected with said second means to force a record receiving member positioned therein into engagement with said record forming means, and means controlled in accordance with the depth of insertion of said record receiving member adapted to control the connection of said manually controlled means with said second means.

31. In mechanism of the class described, in combination, a casing, clockwork positioned therein, record forming means adapted to be driven from said clockwork, means pivotally mounted upon said casing adapted to support a record receiving member and throw the same into operative relation to said record forming means, a manually actuated lever, a connection between said lever and said second-mentioned means, and means controlled in accordance with the depth of insertion of said record receiving member in said supporting member adapted to place said connection in an operative condition.

32. In mechanism of the class described, in combination, a casing, clockwork positioned therein, record forming means adapted to be driven from said clockwork, a shaft mounted adjacent to said casing, a manually actuated lever connected with said shaft, inking means connected with said shaft and adapted to co-act with said record forming means, means pivotally mounted upon said casing adapted to receive a record receiving member, and a connection between said shaft and said last-mentioned means adapted upon said lever being actuated to throw said third-mentioned means toward said record forming means and bringing a record receiving member positioned therein into engagement with said record forming means.

33. In mechanism of the class described, in combination, clockwork driven record forming means, means adapted to force a record receiving member into operative relation thereto upon being set in operative condition, a record receiving member provided with an irregularity in its outer surface, and means controlled in accordance with the position of said irregularity adapted to set said second-mentioned means in operative condition.

34. In mechanism of the class described, in combination, clockwork driven record forming means, means adapted to receive and support a record receiving member, means adapted to force a record receiving member into operative relation with said record forming means, a record receiving member provided with a notch in the outer surface thereof, and means adapted to rest within said notch and place said forcing means in operative condition, said means adapted to rest within said notch being adapted upon displacement to place said forcing means in operative condition.

35. In mechanism of the class described, in combination, clockwork, means adapted to hold a record receiving member, means adapted to be driven from said clockwork adapted upon actuation to make upon said record receiving member two successive records each indicative by its position relative to the outline of said record receiving member of points of time, the period of time between which differs from the period elapsing between the times of making the respective records by a predetermined amount.

36. In mechanism of the class described, in combination, clockwork, means adapted to hold a record receiving member, means adapted to make upon said record receiving member a record indicative by its position relative to the outline of the member of a point of time, a connection between said last-mentioned means and said clockwork, and means adapted automatically to break said connection at a predetermined point of time.

37. In mechanism of the class described, in combination, record forming means, means adapted upon being set in operative condition to force a record receiving member into operative relation thereto and form a record thereon indicative by its position relative to the outline of the record receiving member of a point of time, and means controlled in accordance with the shape of said record receiving member adapted to place said second-mentioned means in operative condition.

38. In mechanism of the class described, in combination, record forming means, manually controlled means adapted upon being set in operative condition to force a record receiving member into operative relation to said record forming means and form a record thereon indicative by its position relative to the outline of the record receiving member of a point of time, and means controlled in accordance with the depth of insertion of a record receiving member within said second means adapted to place the same in operative condition.

39. In mechanism of the class described, in combination means adapted to make two successive records upon a record receiving member, one of said records being indicated by perforations in the record receiving member, each record being indicative of points of time, the period of time between which differs from the period elapsing between the times of making the respective records by a predetermined amount, a movable supporting device adapted to hold various individual record-receiving members in operative relation to a single record-making means, and means adapted to move the supporting device to cause the record-receiving member to move into and out of record-making position relative to said record-making means.

40. In mechanism of the class described, in combination, means adapted to hold a record receiving member, means adapted to make two successive records upon said record receiving member each indicative of points of time, one of said records being indicated by a physical change in the condition of said record receiving member, the period of time between the records indicated upon said record receiving member differing from the period elapsing between the times of making the said records by a predetermined amount, and means adapted to vary such predetermined amount.

41. In mechanism of the class described, in combination, means adapted to support a record receiving member, clockwork, means adapted to perforate said record receiving member to form thereby a record thereon, a connection between said clockwork and said record forming means whereby said clockwork is adapted to drive said record forming means, and means adapted automatically to disconnect said clockwork from said record forming means at a predetermined point of time, said means comprising adjustable members adapted to vary such point of time.

42. In mechanism of the class described, in combination, means adapted to support a record receiving member, clockwork, means adapted to form a record upon said record receiving member by changing the physical characteristics thereof, a connection between said clockwork and said record forming means whereby said clockwork is adapted to drive said record forming means, and means adapted to automatically disconnect said clockwork from said record forming means for a predetermined period of time and automatically to re-connect the same at the expiration of said period, said means comprising adjustable members adapted to vary such period.

43. In mechanism of the class described, in combination, clockwork, means adapted to hold a record receiving member, a plurality of female dies carried by said record member holding means, a plurality of male dies each of which is adapted upon actuation to perforate said record receiving member in a position indicative of a predetermined point of time, and means driven from said clockwork adapted selectively to actuate said male dies.

44. In mechanism of the class described, in combination, clockwork, means adapted to hold a record receiving member, a plurality of female dies carried by said record member holding means, a plurality of male dies each of which is adapted upon actuation to co-act with said female dies and cut in said record receiving member an aperture indicative by its position thereon of a point of time, and means adapted to be driven by said clockwork adapted selectively to actuate said male dies.

45. In mechanism of the class described, in combination, clockwork, means adapted to hold a record receiving member, female dies carried by said record member holding means, a plurality of spring-retracted male dies movable separately and collectively, and means adapted to be interposed in the path of each of said dies upon the same being collectively moved, said interposed means being adapted to force the die in the path of which it is positioned into engagement with said record receiving member whereby a clean-cut aperture is formed therein.

46. In mechanism of the class described, in combination, clockwork, means adapted to hold a record receiving member, a plurality of female dies carried by said record member holding means, a plurality of male dies movable separately and collectively, means adapted to be interposed in the path of one of said dies upon the same being moved, means controlled by said clockwork and controlling the position of said interposed means, and means adapted to move said dies collectively and force the die in the path of which said interposed means is placed into engagement with said record receiving member.

47. In mechanism of the class described, in combination, means adapted to hold a record receiving member, and means adapted simultaneously to make independent records of dissimilar characteristics of points of time one of which is the point of time at which the record is made and the other of which is indicative of a point of time by its position relative to the outline of the record receiving member.

48. In mechanism of the class described, in combination, means adapted to hold a record receiving member, and means adapted simultaneously to make independent records of dissimilar characteristics of points of time one of which is the time at which the record is made and the other of which is comprised by a clean cut aperture in said record receiving member indicative of a point of time by its position relative to the outline of the record receiving member.

49. In mechanism of the class described, in combination, clockwork, means adapted to hold a record receiving member, means adapted to be driven from said clockwork adapted to form in said record receiving member a cleancut aperture at a point indicative, by its position relative to the outline of the record receiving member, of a point of time, and means driven from said clockwork adapted simultaneously with the formation of said first mentioned record to form upon said record receiving member an independent record indicative of the point of time at which the records are made.

50. In mechanism of the class described, in combination, clockwork, means adapted to hold a record receiving member, means adapted to form in said record receiving member a plurality of clean-cut perforations collectively indicative, by their angular dispositions about centers, of a point of time, and means driven from said clockwork adapted simultaneously with the formation of said first mentioned record to form a second record upon said record receiving member indicative of the point of time at which the records are made.

In testimony whereof I affix my signature, in the presence of two witnesses.

PERCY L. HILL.

Witnesses:
HENRY C. ZEINK,
C. H. WILSON.

Copies of this patent may be obtained for five cents each, by addressing the "Commissioner of Patents, Washington, D. C."

It is hereby certified that in Letters Patent No. 1,124,649, granted January 12, 1915, upon the application of Percy L. Hill, of New York, N. Y., for an improvement in "Recording-Machines," an error appears in the printed specification requiring correction as follows: Page 14, after line 24, insert the following claim:

51. In a time recorder, the combination with a time train, of means adapted to record two successive points of absolute time; means for making a record representative of the elapsed time between the respective points, lessened by a predetermined amount; the last point of absolute time record and the qualified elapsed time record being simultaneously made.;

and that the said Letters Patent should be read with this correction therein that the same may conform to the record of the case in the Patent Office.

Signed and sealed this 2nd day of February, A. D., 1915.

[SEAL.]

R. F. WHITEHEAD,
*Acting Commissioner of Patents.*